Patented Jan. 4, 1949

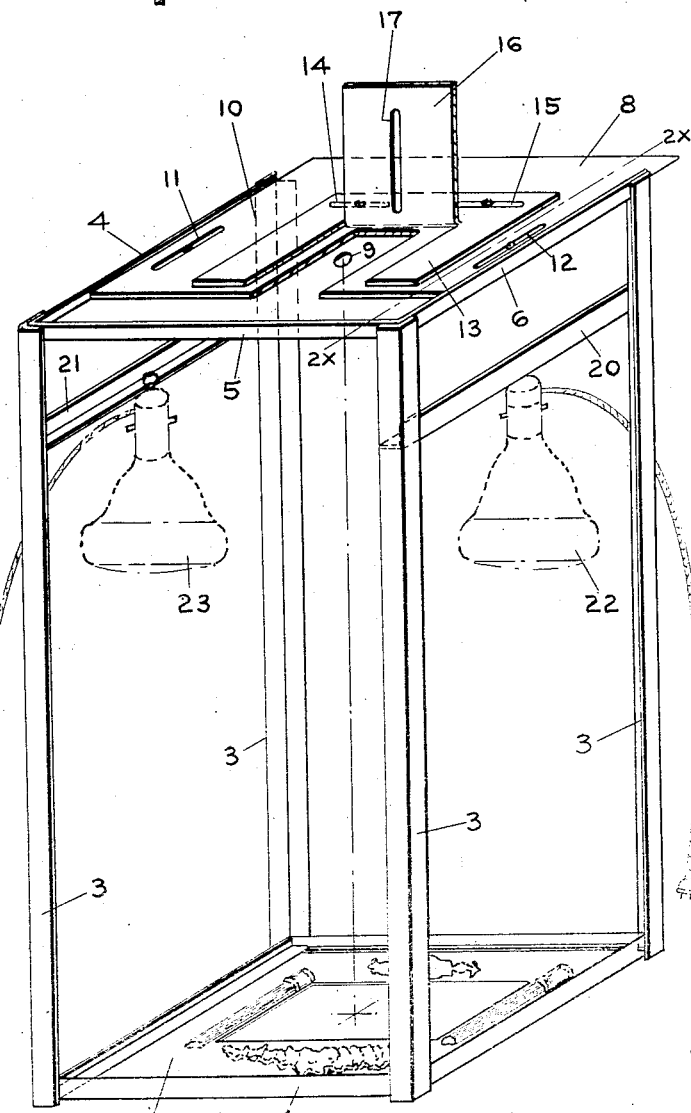
Fig. 1
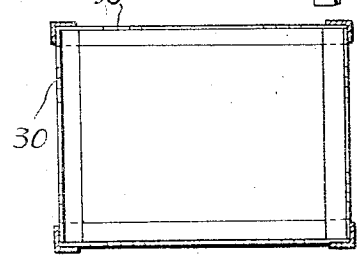
Fig. 3
Fig. 2
INVENTOR.
John L. Rex
BY Frank Kiefer
atty.

2,458,301

UNITED STATES PATENT OFFICE 2,458,301

APPARATUS FOR PHOTOGRAPHING TITLES ON MOTION-PICTURE FILMS

John L. Rex, Rochester, N. Y.

Application October 1, 1945, Serial No. 619,532

6 Claims. (Cl. 88—24)

Motion pictures are taken by amateurs using small cameras that are specially made for that purpose. The films of these motion pictures when developed must have titles that are descriptive of the pictures, but before taking the picture there is usually no opportunity to photograph the title in its proper place on the film; namely, in advance of the picture on the film. This title must thereafter be photographed separately on a film and developed and then must be cemented to the picture film at the proper place after the picture film is developed. Usually it is necessary to cut the picture film in order to insert the title film at the proper place.

I have invented a stand, the object of which is to hold the camera and the title in a suitable position with reference to each other for the purpose of photographing the title on the film so that the film having the title photographed thereon and developed can be inserted in the picture film in its proper place; namely, in advance of the picture which it describes.

Another object of the invention is to provide an upright platen to which any standard camera for taking amateur moving pictures can be clamped in the same way that it can be clamped on the horizontal top or deck of a tripod.

Another object of the invention is to provide a slot in the upright platen through which slot the camera can be clamped in place by a screw so that its lens is two feet or at the correct focal length from the lower deck.

Another object of the invention is to provide in the stand an upper deck with a round opening therein through which the lens of the camera can be centered and exposed when the camera is clamped in position on the platen.

Another object of the invention is to provide adjustments on the upper deck by which the platen with the camera attached thereto can be adjusted forward or back or to the right or left so as to make the lens of the camera register with the hole in the upper deck.

Another object of the invention is to provide, in the stand, a lower deck at a proper distance below the upper deck on which the words and characters of the title can be set up and displayed for the purpose of photographing it on the film of the motion picture camera placed on the platen above the upper deck.

Another object of the invention is to provide below the upper deck suitable artificial illumination which will illuminate the title displayed on the lower deck.

Another object of the invention is to provide a stand for universal use on which any of the standard makes of motion picture cameras can be used as above described for the purpose of photographing the title on the film.

Another object of the invention is to calibrate the lower deck with marks that will indicate the field of the various lenses used in the cameras.

Another object of the invention is to combine all of the above features in a suitable article of manufacture that can be easily transported and used.

These and other objects of the invention will be illustrated in the drawings, described in the specification and pointed out in the claims at the end thereof.

In the drawings:

Figure 1 is a perspective view of the stand having the lower and upper decks therein and the upright platen on the upper deck to which the camera can be attached and on which adjustments are provided for the platen and camera in three dimensions.

Figure 2 is a transverse section on the line 2x, 2x of Figure 1.

Figure 3 is a top plan view of the angle frame 1 with calibrations marked thereon.

In the drawings, like reference numerals indicate like parts.

In the drawings, reference numeral 1 indicates a rectangular frame at the bottom of the stand made up of angles joined together. The dimensions of this frame are preferably about nine inches by twelve inches. These angles support a platen 2 which can be of metal, wood, fibre or cardboard as may be desired. At the corners of the frame are attached four suitable uprights 3,3—3, 3 which are also angles and extend upwardly about twenty five inches. At the top of the uprights is attached a rectangular frame made up of angles. In three of these angles 4, 5 and 6 the flange of the angle is turned up and on the reverse side, the angle 7 has its flange either turned down or is omitted. On the angles rests a plate 8 which forms the upper deck of the stand. This plate has a hole 9 therein which is placed substantially at the center of the deck. This deck 8 is fastened to two of the angles by screws or in any other suitable manner so that it cannot move in the upper frame.

On the upper deck rests a lower plate 10 which is slotted as indicated at 11 and 12. Screws extend through these slots and through the upper deck into the horizontal members of the angles by which the upper deck can be held fixed in one position and by which slots 11 and 12 the lower plate 10 can be moved back and forth to the position in which it may be desired to hold it.

On the lower plate 10 is the upper plate 13 which is provided with slots 14 and 15 through which screws extend into the lower plate 10. By releasing the screws the upper plate 13 can be moved to the right or left.

Integral with the upper plate is the upright platen 16 having a long slot 17 therein. All moving picture cameras have a base by which they can be placed on and attached to the deck of a tripod. In this base is a female thread which is engaged by a screw in the deck on the tripod by which the camera is clamped to the tripod. This same female thread in the camera is placed in line with the slot 17 and a screw with a male thread is provided which extends through the slot 17 and engages with the female thread in the base of the camera, and by turning the screw the camera can be firmly clamped in place on the upright platen with the lens thereof pointing down through the hole 9 of the deck 8.

It will be understood that both the lower plate 10 and the upper plate 13 are cut away on one side with rectangular openings as shown in Figure 1 so that the hole 9 is left uncovered thereby when the plates are moved. It will also be understood that the upper deck and the two plates 9 and 13 shut off all light from below from the operator except the light that comes through the hole 9 in the upper deck.

All of the so-called amateur motion picture cameras have a minimum focal length of about two feet so that when the camera is attached to the platen 16 the lens of the camera can be accurately focused on the deck 2.

It will be understood that the so-called amateur moving picture cameras are of different sizes and different weights and the position in which each of these cameras must be attached to the upright platen 16 is such that the center of the lens will be in line with the center of the hole 9 but because of variations of dimensions and other characteristics of the camera the position of the platen 16 that would be correct for a camera of one make would not be correct for a camera of a different make, therefore adjustments in three dimensions are necessary. The adjustments by the slots 11 and 12 permit the movement of the lower plate 10 so that the lens of the camera will be placed correctly in line with the hole 9 in one direction. The adjustment of the upper plate 13 with the slots 14 and 15 permit the adjustment of the platen and the lens of the camera so as to bring the lens of the camera in line with the hole 9 in a direction at right angles to the adjustment of the plate 10.

The base of the moving picture camera must be placed upright on the upper deck and against the upright platen 16 with the lens in position to focus through the hole 9 in the upper deck. In the base of all or nearly all moving picture cameras is a female screw thread by which it can be fastened upon a tripod. This hole is placed in line with a slot 17 and a male screw is inserted through the slot and screwed into the female thread in the base of the camera. In this way the base of the camera is fastened to the platen. The female thread in the base of the camera will be at one distance from the lens in one camera and at another distance in another camera. The length of the slot 17 permits the male screw to be inserted through the slot at any elevation that is needed to engage with the female thread in the base of the camera when its lens is in focus position.

On the lower deck I have placed suitable ornaments which constitute a frame, inside of which the legend describing the picture is displayed. The legend and the ornaments will, when photographed appear as a unit that is pleasing to the eye of the spectator. It will also be understood that the legend can be printed on a card or can be made up of separate letters and characters that are assembled on the lower deck, in much the same way as letters are assembled on the directory board in office buildings, and these letters can be of standard size so that when photographed on the film and developed they will give a pleasing projection on the screen.

In order to provide strong artificial illumination of the lower deck with the legend and characters thereon I provide the cross bars 20 and 21 having the lamps and reflectors 22 and 23 thereon. These give a powerful illumination of the lower deck without in any way blinding or confusing the vision of the operator who is setting up the apparatus for the exposure of the film.

It will also be understood that different lenses are used in the various cameras, some of which lenses have a narrow field and others of which have a wide field, and the angles that support the lower deck are marked or calibrated to indicate the field of the wide angle or the narrow angle lenses so that the ornamental frame and the legend inside of the frame can be set up to correspond with the field of the lens.

These marks appear on the marginal double lines forming the outside of Figure 3. They appear as dots and are arranged in groups of four at eight places and are indicated by the reference numeral 30, 30.

It will be understood that amateur motion picture cameras are made in two sizes. One size takes a film of 8 mm. width and the other size takes a film of 16 mm. width. This apparatus can be used to hold the cameras of either size while photographing the titles for the films of either of those sizes.

I claim:

1. A stand having a lower deck capable of supporting a title, an upper deck having a hole placed centrally therein, a lower plate supported above the upper deck and adjustable thereon in one direction, an upper plate supported on the lower plate and adjustable thereon in a transverse direction, each of said plates having a large opening cut therein to expose the hole in the upper deck, an upright platen attached to said upper plate for supporting a camera above the upper deck with the lens of the camera pointed down to the lower deck and exposed through the hole in the upper deck.

2. A stand having a lower deck and an upper deck, a hole placed centrally in the upper deck, a lower plate supported on the upper deck and adjustable thereon in one direction, an upper plate supported on the lower plate and adjustable thereon in a transverse direction, an upright platen fastened to the upper plate, means for fastening a camera to the upright platen with the lens of the camera pointing down to the lower deck through the hole in the upper deck.

3. A stand having a lower deck and an upper deck parallel thereto, the upper deck having a hole therein remotely placed from the edges of the upper deck, two U-shaped plates placed on the upper deck, one on top of the other, one of said plates being adjustable in one direction on the upper deck, the second plate moving with the first named plate and being adjustable transversely to the first named plate, an upright platen on the second plate and moving therewith, means for fastening a camera with a lens therein on said platen above the upper deck, the adjustment of said plates forward or sideways making it possible to bring the axis of the lens of the camera in a vertical line above the hole of the upper deck.

4. A stand having a lower deck and an upper deck parallel thereto, the upper deck having a hole therein remotely placed from the edges of the upper deck, two U-shaped plates each recessed from the same edge, placed on the upper deck, one on top of the other with the recess of each plate enclosing and exposing the hole in the deck, one of said plates being adjustable back and forth in one direction on the upper deck, the second plate moving with the first named plate and being adjustable transversely on the first named plate, an upright platen on the second plate and moving with the first and second plates as above described, means for fastening the base of a camera on the upright platen above the upper deck with the lens pointing toward the hole in the upper deck, said plates being adjustable forward or sideways to bring the axis of the lens of the camera in a vertical line with the hole in the upper deck.

5. A stand having a lower deck and an upper deck parallel thereto, the upper deck having a hole therein remotely placed from the edges of the upper deck, two U-shaped plates placed on the upper deck one on top of the other, the lower U-shaped plate being adjustable forward and back on the upper deck, the upper plate moving with the first named plate, and being adjustable sideways on the lower plate, an upright platen integral with the second plate and moving therewith, means for fastening the base of a camera thereon with the lens of the camera pointed down centrally through the hole in the upper deck, the adjustment of said plates forward or back or sideways making it possible to bring the axis of the lens of the camera in a vertical line above the hole of the upper deck for the purpose of focusing on the lower deck.

6. In an apparatus for photographing titles for moving picture films, the combination of an upright structure having four uprights enclosing four open sides and having a horizontal rectangular frame at the bottom and another frame at the top thereof, said horizontal frames being connected to said uprights, a horizontal platen supported on the bottom horizontal frame for holding titles to be photographed, a deck supported on the upper rectangular frame, said deck having a hole placed centrally therein, lamps and reflectors supported in two opposite sides of the upright frame below said upper deck for throwing light down on the horizontal platen, and upright platen above the upper deck for supporting a camera in a vertical position with the lens of the camera pointing down, means for adjusting the upright platen and camera forward or back or sideways so as to bring the axis of the lens of the camera in line with the axis of the hole in the upper deck and in focus on the titles on the horizontal platen.

JOHN L. REX.

REFERENCES CITED

The following references are of record in the file of this patent:

UNITED STATES PATENTS

| Number | Name | Date |
| --- | --- | --- |
| 94,120 | Knapp | Aug. 24, 1869 |
| 1,197,780 | Van Doran | Sept. 12, 1916 |
| 1,819,883 | Fleischer | Aug. 18, 1931 |
| 1,837,704 | Dean | Dec. 22, 1931 |
| 1,933,817 | Miller et al. | Nov. 7, 1933 |